United States Patent
Vitaladevuni et al.

(10) Patent No.: US 9,899,021 B1
(45) Date of Patent: *Feb. 20, 2018

(54) STOCHASTIC MODELING OF USER INTERACTIONS WITH A DETECTION SYSTEM

(71) Applicant: Amazon Technologies, Inc., Reno, NV (US)

(72) Inventors: Shiv Naga Prasad Vitaladevuni, Cambridge, MA (US); Bjorn Hoffmeister, Seattle, WA (US); Rohit Prasad, Acton, MA (US)

(73) Assignee: Amazon Technologies, Inc., Seattle, WA (US)

(*) Notice: Subject to any disclaimer, the term of this patent is extended or adjusted under 35 U.S.C. 154(b) by 542 days.

This patent is subject to a terminal disclaimer.

(21) Appl. No.: 14/136,712

(22) Filed: Dec. 20, 2013

(51) Int. Cl.
*G10L 15/00* (2013.01)
*G10L 15/14* (2006.01)

(52) U.S. Cl.
CPC ................ *G10L 15/142* (2013.01)

(58) Field of Classification Search
CPC ..... G10L 15/08; G10L 15/1815; G10L 15/01; G10L 15/063; G10L 15/065; G10L 15/22; G10L 15/07; G10L 15/20; G10L 17/22; G10L 15/30; G10L 17/04; G10L 21/0208; G10L 15/02; G10L 15/05; G10L 15/06; G10L 15/18; G10L 15/26; G10L 17/00; G10L 17/005; G10L 17/02; G10L 17/06; G10L 17/08; G10L 19/00; G10L 2015/0635; G10L 2015/0636; G10L 2015/0638; G10L 2021/02161; G10L 2021/02168; G10L 21/0216; G10L 15/19; G10L 25/09

See application file for complete search history.

(56) References Cited

U.S. PATENT DOCUMENTS

| | | | | | |
|---|---|---|---|---|---|
| 5,675,706 | A | * | 10/1997 | Lee | G10L 15/04 704/254 |
| 5,737,489 | A | * | 4/1998 | Chou | G10L 15/063 704/232 |
| 5,737,724 | A | * | 4/1998 | Atal | G10L 15/10 704/236 |
| 5,937,381 | A | * | 8/1999 | Huang | G10L 17/24 704/214 |
| 6,223,155 | B1 | * | 4/2001 | Bayya | G10L 15/07 704/243 |

(Continued)

*Primary Examiner* — Abdelali Serrou
(74) *Attorney, Agent, or Firm* — Knobbe, Martens, Olson & Bear, LLP (57) ABSTRACT

Features are disclosed for modeling user interaction with a detection system using a stochastic dynamical model in order to determine or adjust detection thresholds. The model may incorporate numerous features, such as the probability of false rejection and false acceptance of a user utterance and the cost associated with each potential action. The model may determine or adjust detection thresholds so as to minimize the occurrence of false acceptances and false rejections while preserving other desirable characteristics. The model may further incorporate background and speaker statistics. Adjustments to the model or other operation parameters can be implemented based on the model, user statistics, and/or additional data.

21 Claims, 5 Drawing Sheets

(56) References Cited

U.S. PATENT DOCUMENTS

| | | | | |
|---|---|---|---|---|
| 7,216,077 B1* | 5/2007 | Padmanabhan | | G10L 15/065 704/240 |
| 7,533,019 B1* | 5/2009 | Hakkani-Tur | | G10L 15/065 704/244 |
| 7,657,433 B1* | 2/2010 | Chang | | G10L 15/08 704/236 |
| 7,865,362 B2* | 1/2011 | Braho | | G10L 15/08 704/251 |
| 9,330,665 B2* | 5/2016 | Morales | | G10L 15/065 |
| 2002/0002445 A1* | 1/2002 | Doliov | | G06F 17/30867 703/2 |
| 2002/0055844 A1* | 5/2002 | L'Esperance | | H04M 1/271 704/260 |
| 2003/0050783 A1* | 3/2003 | Yoshizawa | | G10L 15/065 704/270.1 |
| 2003/0125945 A1* | 7/2003 | Doyle | | G10L 15/01 704/246 |
| 2003/0216916 A1* | 11/2003 | Navratil | | G10L 17/06 704/250 |
| 2004/0230105 A1* | 11/2004 | Geva | | A61B 5/04012 600/301 |
| 2004/0254790 A1* | 12/2004 | Novak | | G10L 15/08 704/240 |
| 2006/0178882 A1* | 8/2006 | Braho | | G10L 15/08 704/240 |
| 2006/0200347 A1* | 9/2006 | Kim | | G10L 15/22 704/236 |
| 2006/0293886 A1* | 12/2006 | Odell | | G10L 15/08 704/231 |
| 2007/0192101 A1* | 8/2007 | Braho | | G10L 15/065 704/251 |
| 2007/0203863 A1* | 8/2007 | Gupta | | G06N 99/005 706/20 |
| 2008/0126100 A1* | 5/2008 | Grost | | G10L 15/08 704/275 |
| 2009/0259466 A1* | 10/2009 | Stubley | | G10L 15/08 704/240 |
| 2011/0029311 A1* | 2/2011 | Minamino | | G10L 15/183 704/243 |
| 2011/0161084 A1* | 6/2011 | Lin | | G10L 15/08 704/252 |
| 2011/0218805 A1* | 9/2011 | Washio | | G10L 15/00 704/251 |
| 2012/0271634 A1* | 10/2012 | Lenke | | G10L 15/22 704/251 |
| 2013/0268270 A1* | 10/2013 | Jiang | | G10L 15/07 704/236 |
| 2013/0275135 A1* | 10/2013 | Morales | | G10L 15/065 704/236 |
| 2014/0278391 A1* | 9/2014 | Braho | | G10L 15/20 704/233 |
| 2015/0081296 A1* | 3/2015 | Lee | | G10L 15/20 704/239 |

* cited by examiner

STOCHASTIC MODELING OF USER INTERACTIONS WITH A DETECTION SYSTEM

BACKGROUND

Computing devices can be used to recognize faces, voices, handwriting, and other objects and patterns. In a typical implementation, a computing device can continuously monitor an input stream or receive a batch of input data. This input stream may be, for example, a video stream from a video camera or an audio stream from a microphone. The computing device can determine whether a portion of the input stream is likely to contain information corresponding to the target item, object, or pattern to be detected. For example, the computing device can make a preliminary determination as to whether a particular portion of the input stream includes to any face, any speech, or any handwriting at all. Once the computing device has made this preliminary determination, the computing device can then perform other processing or cause other processing to be performed. The computing device may perform recognition of which particular face, voice, or other target is present in the input stream in addition to detecting whether any face, voice, etc. is present in the input stream.

A user's experience with the above detection system can be defined in terms of performance latencies and detection errors. These can include false acceptances and false rejections. False acceptances occur when the detection system erroneously hypothesizes from the input data that the user is trying to initiate communication with the computing device. False rejections occur when the detection system fails to respond to user communication directed at the computing device. Detection systems may use the concept of a confidence score when detecting the target item, object, or pattern. Higher confidence in the accuracy of the detection can be reflected by a higher confidence score, while lower confidence in the accuracy of the detection can be reflected by a lower confidence score. The detection system may use an operational threshold, such as a confidence score threshold, to help determine when the target item has been detected. If the detection system determines that the operational threshold has been met, additional processing can occur.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

A user may interact with a computing device in various ways, and the device may include a detection component or system to determine when the user is interacting with the device. A detection system may use or otherwise be based on a model of the manner in which a user interacts with a computing device. The model may be based on numerous disparate data points or parameters, such as the probability of an erroneous hypothesis by the detection system of a user's intent, the probability that a user may perform different actions, and the costs associated with each of the detection system's actions. Generally described, detection systems, such as systems configured to detect the presence of a face in video input or speech in audio input, can determine how likely it is that a given input includes the detection target, such as a particular face or a particular spoken word or phrase. False acceptances and false rejections by the detection system can have a negative impact on a user's experience with the system. Therefore, when setting operational parameters of a detection system (e.g., thresholds for detection scores), system developers typically try to minimize the occurrence of false acceptances and false rejections while preserving other desirable operational characteristics of the detection system.

In some implementations, detection is the first step in a process that utilizes detected faces, speech, etc. For example, a detection system may be configured to detect the presence of a particular spoken word or phrase in a continuous audio input stream. Such a word may be referred to as a "wake word." The wake word may be used by a user to indicate that the user is addressing the computing device and that a spoken query or command will follow. For example, the user may say, "Phone, play me a Beatles song." The wake word in this utterance is "phone" and precedes a "play music" command. When the wake word is detected, the subsequent utterance can be processed by an automatic speech recognition ("ASR") system to recognize the speech and initiate other processing responsive to the spoken query or command. A detection system may also be configured to detect an utterance directed at the computing device, e.g., device-directed speech ("DDS"), even though the user may not preface the utterance with a wake word. The user may say, for example, "Skip that song."

Detection systems may calculate detection scores (e.g., confidence scores, likelihoods, probabilities) reflecting the likelihood that the utterance was directed at the computing device. A false acceptance may occur when the detection score exceeds some operational threshold, also referred to as a detection threshold, even though the wake word was not spoken or the user was not trying to initiate communication. The input stream that follows the erroneously hypothesized utterance may be processed by the ASR system, and some undesirable action may be performed. For example, playback of media may be stopped even though the user was not addressing the computing device with a wake word and/or a command to stop playback.

Users may be extremely sensitive to false acceptance errors. Because the detection system may operate continuously, the errors may be measured as a function of operational time length. False acceptance errors may be measured in terms of the number of false acceptances per hour ("FAH"). Using raw counts may provide the detection system with higher sensitivity to these types of errors.

A false rejection may occur when the detection score falls short of the operational threshold even though the input actually does include some DDS to be detected. In such a case, the user's query or command is not acted upon because the audio input of the user utterance is not provided to the ASR system for processing. False rejections that occur too often can negatively impact the user's experience and the user's perceived performance of the entire system.

Users may perceive false rejection errors in terms of the frequency with which their directed utterances are missed by the system. False rejection errors may be measured in term of the false rejection ratio ("FRR"). The false rejection ratio may be defined as the ratio of the number of instances of false rejections relative to the ground-truth number of instances of the user initiating interaction with the system. It may be likely that if a device does not "wake up" or activate in response to a DDS, the user may attempt to wake the device again. Although the user may be sensitive to a false rejection of a first attempt to wake the device, the user may be highly sensitive if the second device-directed utterance also fails to wake up the device. Therefore, it may be important to measure false rejections at the first and second attempts.

Aspects of the present disclosure relate to determining or adjusting detection thresholds to minimize false acceptance and rejection errors based on the cost (e.g., estimated or expected cost) of such errors. The thresholds can be determined by modeling errors in a detection system using a stochastic dynamical model where each state of the system is determined probabilistically. For example, a detection system may distinguish a second attempt by a user to wake up a device in order to reduce false rejections. Distinguishing second attempts can allow different costs to be associated with such second attempts. The detection system can also use a different detection threshold for such second attempts.

Illustratively, in a detection system it may be likely that if a device fails to wake up or activate in response to a user's directed utterance, e.g., the first attempt or trial, the user may immediately again try to elicit a response. A time window may be defined during which the user is expected to make a second attempt or trial. The detection system may account for the net probability of false acceptance or false rejection. The detection system may utilize these probabilities to optimize its detection model as well as optimize the detection thresholds. The detection system may additionally incorporate different costs into its model. In some embodiments, the detection system may incorporate some standard cost. For example, every time the user directs some utterance toward the device and the device does not detect it, the system may have defined some cost for such an error. This standard cost may be based on users' expectations. Additionally, different costs may be calculated and incorporated into the detection system based on users' expectations at different times or within different environments. The costs may be calculated through user studies, experiments, etc.

Further aspects of the disclosure relate to incorporating background and/or environmental conditions into the detection system by conditioning false acceptance and false rejection probabilities utilizing background-related statistics, speaker-related statistics, or the like. In some embodiments, background and speaker statistics may also be incorporated into the cost of false acceptance and the cost of false rejection. A user may tolerate higher false rejection rates when there is a great deal of background noise. For example, the user may be more willing to overlook a false rejection when the user is currently playing rock music on the device than when the environment is largely silent. If the same model and threshold were used for both background noise and silent conditions, the system may have higher than desired false rejection rates during silent conditions, or higher than desired false acceptance rates during noisy conditions. Alternatively, the system may have higher than optimal false rejection rates during background noise.

Aspects of the embodiments described in the present disclosure may describe, for the purpose of illustration, a client device that transmits data to a wake word module within a networked spoken language processing system. This data may be transmitted for processing when confidence in utterance detection exceeds a threshold. However, the systems and techniques described herein may be used in any number of processes or applications for detecting events in samples of data, including face detection, handwriting detection, and other detection and/or recognition systems. In addition, although certain examples and embodiments will be described with respect to confidence scores, the systems and techniques described herein may be applied to any type of detection score, including likelihoods, probabilities, etc. Various aspects of the disclosure will now be described with regard to certain examples and embodiments, which are intended to illustrate but not limit the disclosure.

Modeling the Cost of a Detection Hypothesis.

Figure 1:
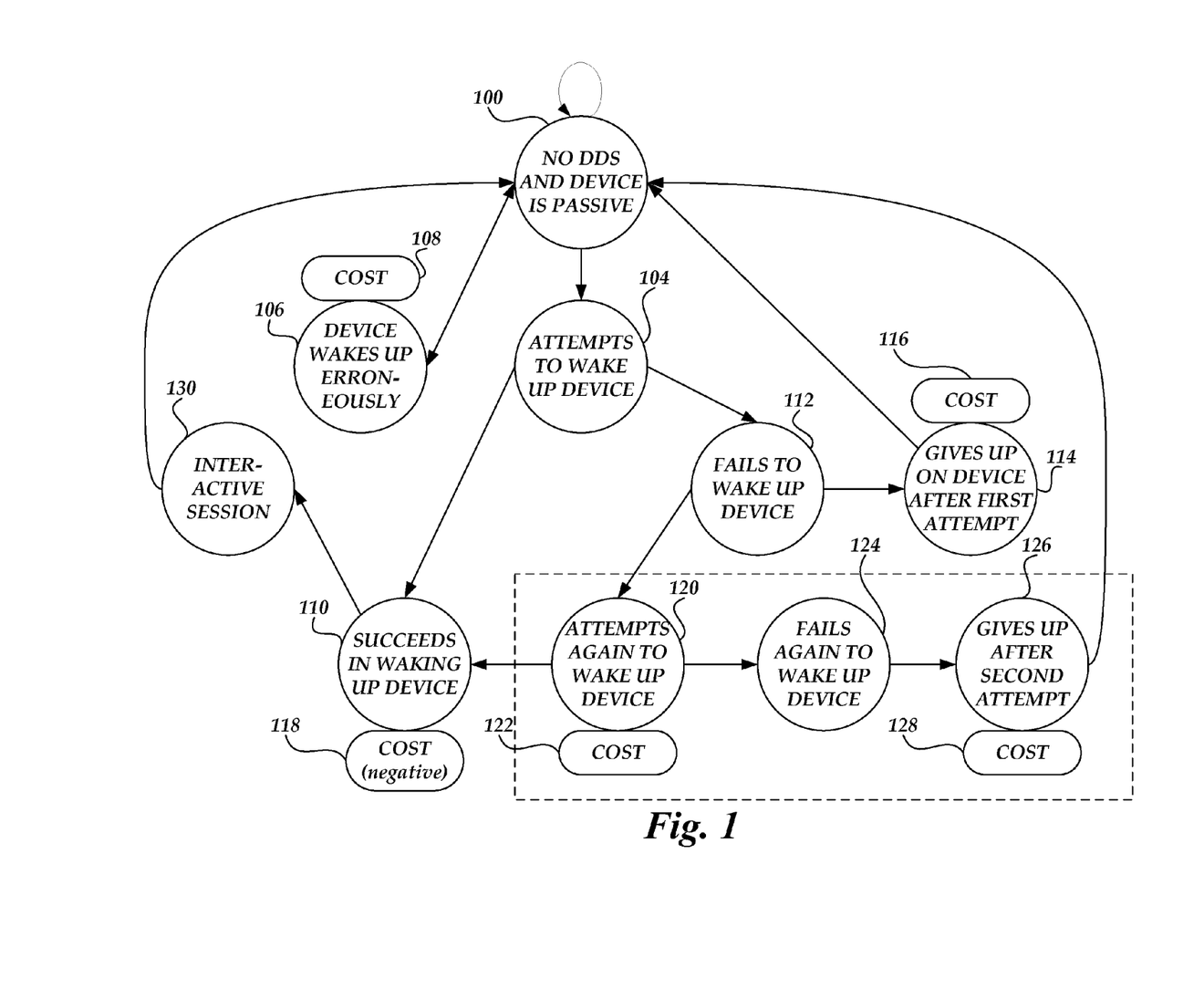
FIG. 1 is an illustrative state diagram of possible user-computing device interactions.

FIG. 1 depicts a state diagram that may be used by a detection system to model and process user interaction with a device. For example, the state diagram shown in FIG. 1 may be implemented as a Markov-based finite state transducer ("FST"). The detection system that uses the state diagram in FIG. 1 may be described for illustrative purposes as a two-trial wake word module, e.g., the user may attempt to wake the device two times before giving up. This two-trial wake word module may be viewed as an escalation of a one-trial wake word module. States 120, 124, and 126 represent the two-trial escalation of a one-trial wake word module, e.g., where the states correspond to a detection system that accounts for the user's second attempt to wake a device rather than giving up after a first failed attempt. In some embodiments, the state diagram illustrated in FIG. 1 and the processes described herein may be extended to include any number of additional trials (e.g., three or more trials and/or escalations).

State 100 corresponds to the state of the wake word module when the user has not uttered any DDS. The device may be passive at state 100. For example, the device may be sleeping. Alternatively, the device may be performing some task, such as playing music. The detection system may continuously monitor the audio environment to determine whether or not to begin processing data. FIG. 1 may be described as depicting a Markov process. This process may have: 1) states such as "No DDS and device is passive" or "Attempts to wake up device," 2) probabilities of transitioning from one state to another, and 3) costs associated with various states.

At state 104, a user may attempt to wake up or activate the device through DDS. The user may attempt to wake up the device by initiating a new session. For example, the user may say to the device, "Phone, play me a Beatles song." The user may also interrupt some current device action. For example, the device may be playing a Beatles song. The user may interrupt this action, however, by saying, "Skip that song."

The DDS may be formatted in two ways. In the first format, the utterance or DDS may be prefaced by a wake word. In the utterance, "Phone, play me a Beatles song," the word "phone" may constitute a wake word. This format may be highly constrained. In the second format, the utterance or DDS may not be prefaced by a wake word. In the utterance, "Skip that song," the user may expect the device to perform the requested action even though the user did not preface the request with a wake word. The likelihood that the user intends to wake the device may be represented by p(user initiates).

As an alternative to state 104, at state 106 the device may erroneously wake though there was no DDS from the user. The probability of the device waking up may be represented by p(false accept). The detection system may commit a false acceptance error if the detection system either incorrectly hypothesizes the onset of DDS at the initial pass of its analysis or, upon not detecting DDS onset, it hypothesizes DDS onset in some time window shortly thereafter. As described above, there may be a cost 108 associated with the device waking up erroneously, e.g., cost(false accept). The device may return to its passive state 100.

In one embodiment, the user may first attempt successfully to wake up the device at state 110. The probability that the user's first attempt will successfully wake up the device may be represented by p(true accept trial 1). There may be a negative cost 118 associated with successfully waking up the device, e.g., cost(success) negative. For example, the user may approve if the device successfully wakes as the user intended. This cost of success is not associated with an error, but a successful completed action. Thus, it may be a negative value rather than the positive value of a cost associated with an error. The user may have some interactive session with the device at state 130. The device may process the DDS at state 130 and then perform the action corresponding to the DDS. For example, the device may process the DDS "Phone, play me the Beatles," and then begin playing music by the Beatles. The device may return to a passive state 100.

If the user's DDS at state 104 is unsuccessful at state 112, the device will not wake. The probability that the user's first attempt will fail to wake up the device may be represented by p(false reject trial 1). At state 114, the user may give up on waking the device after the first attempt. Alternatively, the user may attempt a second time to wake up the device at state 120. The probability that the user will attempt a second time to wake up the device may be represented by p(2Trial). There may be a cost 116 associated with the user giving up after the first attempt, e.g., cost(giving up after 1 attempt). There may also be a cost 122 associated with attempting to wake up the device a second time, e.g., cost($2^{nd}$ attempt).

If, after a first unsuccessful attempt, the user attempts a second time to wake the device up at state 120, the user may again fail to wake up the device at stage 124. The probability that the user's second attempt will not wake up the device may be represented by p(false reject trial 2) The user may then give up at stage 126 after the second attempt. There may be a cost 128 associated with the user giving up on the device after the second attempt, e.g., cost(giving up after 2 attempts). Typically, the cost 128 associated with giving up after two unsuccessful attempts will be greater than the cost 116 associated with giving up after one attempt.

Alternatively, the user may successfully attempt a second time to wake the device up at state 120. If the user succeeds, the device may wake at state 110 followed by an interactive session at state 130. The device may then return to passive state 100. The probability that the user's second attempt may wake up the device may be represented by p(true accept trial 2).

Detection Using Streaming Audio

Upon receiving an audio input segment, a detection system may decide whether or not to open a network or cloud stream and forward the audio segment to the cloud for further speech processing. The detection system may not forward an audio segment, $a_i$, to the cloud unless the decision confidence, $h_0(a)$, that this segment contains DDS is greater than or equal to some detection threshold $\theta_0$. Each audio segment $a_i$ may have some corresponding ground-truth label $y_i$. This ground truth label can indicate whether the audio segment actually contains DDS, and thus whether the cloud stream should be opened. If the cloud stream should be opened, $y_i=1$. Otherwise, $y_i=0$.

False acceptance errors, e.g., when a detection system wrongly hypothesizes the presence of DSS, may occur when $h_0(a_i)$ is greater than or equal to the detection threshold $\theta_0$ at a time when the ground truth $y_i=0$. False rejection errors, e.g., when a detection system fails to detect that DDS has occurred, may occur when $h_0(a)$ is less than the detection threshold $\theta_0$ at a time when $y_i=1$. The FAH may be defined as:

$$FAH = \frac{\sum_i \text{length}(a_i) \times \lfloor h_0(a_i) \geq \theta_0 \wedge y_i = 0 \rfloor}{\sum_i \text{length}(a_i)}. \quad [1]$$

The FRR may be defined as:

$$FRR = \frac{\sum_i \lfloor h_0(a_i) < \theta_i \wedge y_i = 1 \rfloor}{\sum_i \lfloor y_i = 1 \rfloor}. \quad [2]$$

Figure 2:
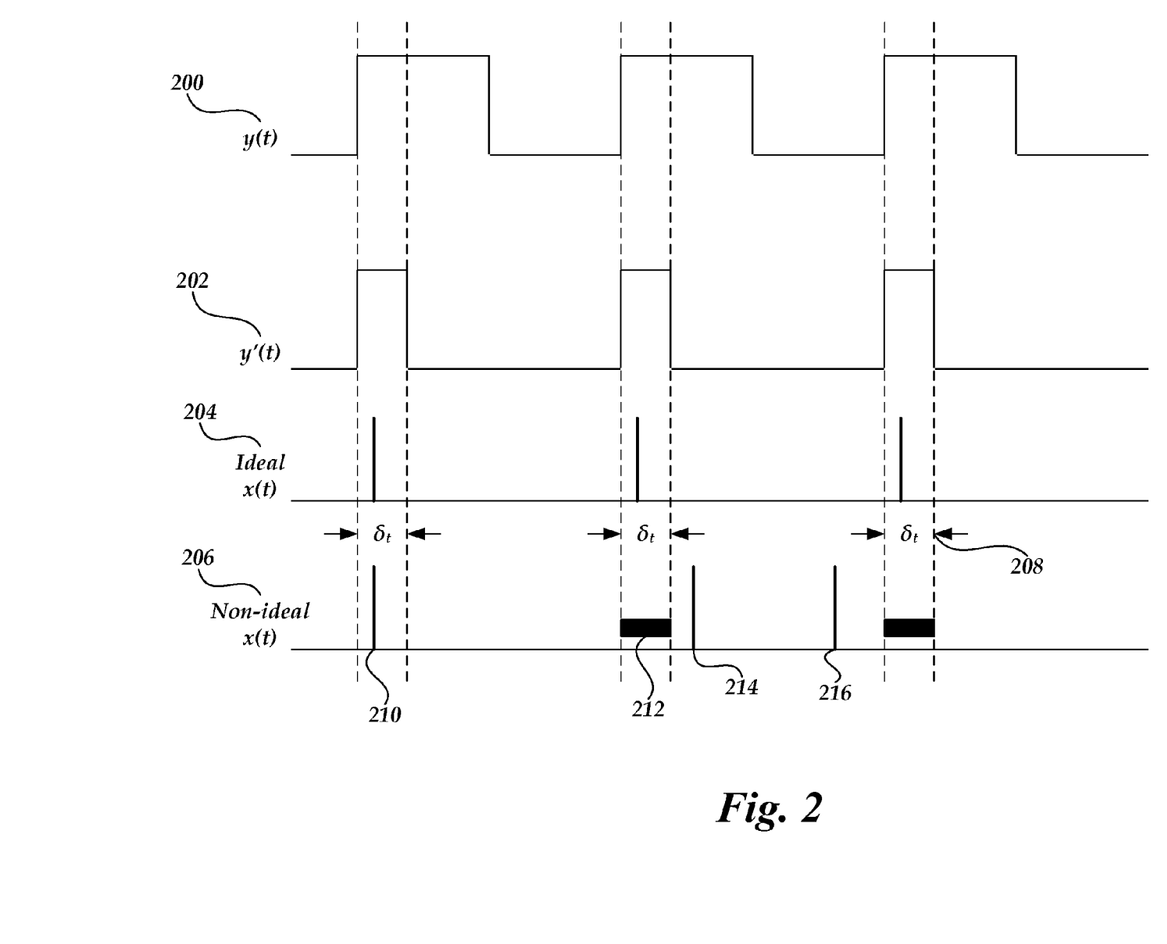
FIG. 2 is a graph demonstrating a detection system's continuous monitoring and response to an audio environment.

If a detection system is presented with streaming data, as illustrated in FIG. 2, instead of an audio input segment, the detection system may continuously monitor the surrounding audio environment in order to determine whether or not to open the cloud stream. Here, a(t) may represent the audio environment as it is a time-varying function. The corresponding ground-truth label 200 indicating the presence or absence of DDS may now be represented by y(t). y(t) may equal 1 if the user was talking to the device at time t. Otherwise, the ground-truth label 200 may be 0.

The detection system may have a binary hypothesis of whether the user was talking to the device at time t. This hypothesis may be represented by x(t). When the detection system hypothesizes DDS onset, x(t) may go instantly to a value of 1 before shifting back to 0, e.g., x(t) is an impulse train. An ideal x(t) 204 may have an impulse whenever y(t) 200 shifts from 0 to 1 as it correctly detects whenever y(t) 200 shifts. The ideal x(t) 204 may do so within a specified time window parameter 208, such as $\delta_r$.

A non-ideal x(t) 206 may be used to represent what the detection system actually reacts to under certain conditions. The non-ideal x(t) 206 consists of correct detections and incorrect detections. Impulse 210 depicts a correct detection. As y(t) 200 shifts from 0 to 1 to reflect the presence of some DDS, the non-ideal x(t) 206 correctly concludes that the user was talking to the device at time t. The cloud stream may be opened and the audio stream forwarded to the cloud stream for speech recognition processing.

212 represents a false rejection. y(t) 200 may shift from 0 to 1 to reflect the presence of some DDS. However, non-ideal x(t) 206 may fail to detect the shift within time window $\delta_t$ 208. As a result, non-ideal x(t) 206 may not contain an impulse at 212.

Impulse 214 represents a false acceptance. Non-ideal x(t) 206 detects something at 214. y(t) 200 may be equal to 1. However, this impulse 214 fell outside of the time window $\delta_t$ 208 allotted for accurate detection. As such, 216 may be treated as a false acceptance.

Impulse 216 also represents a false acceptance. Non-ideal x(t) 206 hypothesizes the onset of DDS at 216. However, y(t) 200 may be equal to 0 at 216. This indicates that there may not be DDS at the time of impulse 216. As such, impulse 216 may be treated as a false acceptance just like impulse 214.

x(t) may be formally evaluated with respect to a given y(t). The detection system may consist of a standard set G of time instances with DDS onset, e.g., when y(t) 200 shifts from 0 to 1. A may represent the set of automatically hypothesized time instances of DDS onset, e.g., x(t)=1. T may represent the time length of the audio stream in terms of hours.

The FAH may now be defined as:

$$\frac{|\{t \mid t \in G \wedge y(t) = 0\}|}{T}. \tag{3}$$

Illustratively, an FAH less than 1/10, e.g., less than 2.5 false acceptances per day, may be desirable. The FRR may now be defined as $$\frac{\left|\left\{t \mid t \in G \wedge \max_{t' \in [t, t+\delta_t]} x(t) = 0\right\}\right|}{|G|}. \tag{4}$$

Illustratively, an FRR1 less than 1/10, e.g., where the system may miss only one out of ten instances of interaction initiation from the user, may be desirable. An FRR2 less than 2/100, e.g., where the module may miss only two out of one hundred instances of interaction initiation from the user, may also be desirable.

The detection system may consist of a one-trial wake word module. The cost of selecting a value for x(t) at each time instant t may be derived for this one-trial scenario. The wake word module may set the value of x(t) at each time instance so as to minimize the cost, thus enhancing the user experience. The module may first define the probability that the module detects a non-existent DDS as well as the probability that the module fails to detect an actual DDS in order to calculate the cost.

The probability of false acceptance may be given by:

$$p(\text{false accept})p(h_0(a(t)) \geq \theta_0) \tag{5}.$$

$h_0(a(t))$ may be defined as the function that takes the audio stream up to and until time t as input. The function $h_0(a(t))$ may output a confidence value for the onset of DDS at time t. The wake word module may set x(t) equal to 1 if $h_0(a(t))$ is greater than or equal to detection threshold parameter $\theta_0$.

In order to derive the cost, a function y'(t) 202 may first be defined such that y'(t)=1 only during the $\delta_t$ time window 208 after every time y(t) 200 shifts from 0 to 1. A DDS may be falsely rejected if x(t)=0 for the entire duration of the $\delta_t$ time window, e.g., when a function y'(t) 202 is 1. The probability of false rejection may be given by:

$$p(h_0(a(t)) < \theta_0, y'(t) = 1) \geq p(\text{false reject}) \geq \tag{6}$$
$$p\left(\max_{s \in [t-\delta_t, t+\delta_t]} h_0(a(s)) < \theta_0, y'(t) = 1\right).$$

Utilizing both equation [5] and [6], the cost at time t, where the cost of success is normalized as 0, may be given by:

$$\text{cost}(t) = \frac{c_{FAH}}{T} p(\text{false accept})(1 - p(\text{user initiates})) + \tag{7}$$
$$\frac{c_{FRR}}{|G|} p(\text{false reject}) p(\text{user initiates}).$$

The cost of false acceptance per hour may be denoted by $c_{FAH}$. The cost of false rejection rate may be denoted by $c_{FRR}$ and is assumed to be non-negative.

Incorporating the above probabilities produces a cost, cost(t), where the cost is less than:

$$\text{cost}(t) \leq \frac{c_{FAH}}{T} \times p(h_0(a(t)) \geq \theta_0, y'(t) = 0)(1 - p(\text{user initiates})) + \tag{8}$$
$$\frac{c_{FRR}}{|G|} \times p(h_0(a(t)) < \theta_0, y'(t) = 1) p(\text{user initiates}),$$

and the cost is greater than:

$$\text{cost}(t) \geq \frac{c_{FAH}}{T} p(h_0(a(t)) \geq \theta_0, y'(t) = 0)(1 - p(\text{user initiates})) + \tag{9}$$
$$\frac{c_{FRR}}{|G|} p\left(\max_{s \in t-\delta_t, t+\delta_t} h_0(a(s)) < \theta_0, y'(t) = 1\right) p(\text{user initiates}).$$

One approach to calculate cost(t) may be to select the detection threshold parameter $\theta_0$ so as to minimize the following equation:

$$C(t; \theta_0) = \frac{c_{FAH}}{T} \times p(h_0(a(t)) \geq \theta_0, y'(t) = 0)(1 - p(\text{user initiates})) + \tag{10}$$
$$\frac{c_{FRR}}{|G|} p(h_0(a(t)) < \theta_0, y'(t) = 1) p(\text{user initiates}).$$

For an illustrative example of the standard cost with detection threshold $\theta_0$, the resulting costs and probabilities may be as follows:

$$p(h_0(a(t)), y'(t) = 0) = p(h_0(a(t)) \mid y'(t) = 0) p(y'(t) = 0)$$
$$= N(h_0(a(t)), -1, 2) \times 0.5$$
$$p(h_0(a(t)), y'(t) = 1) = p(h_0(a(t)) \mid y'(t) = 1) p(y'(t) = 1)$$
$$= N(h_0(a(t)), 1, 0.5) \times 0.5$$
$$p(\text{user initiates}) = 0.5, \frac{c_{FAH}}{T} = 2 \text{ and } \frac{c_{FRR}}{|G|} = 1.$$

Here, $N(x, \mu, \sigma)$ represents the normal distribution for x with mean $\mu$ and standard deviation $\sigma$. This one-trial module may be escalated to a two-trial wake word module, as depicted in FIG. 1.

Error Modeling

Figure 3:
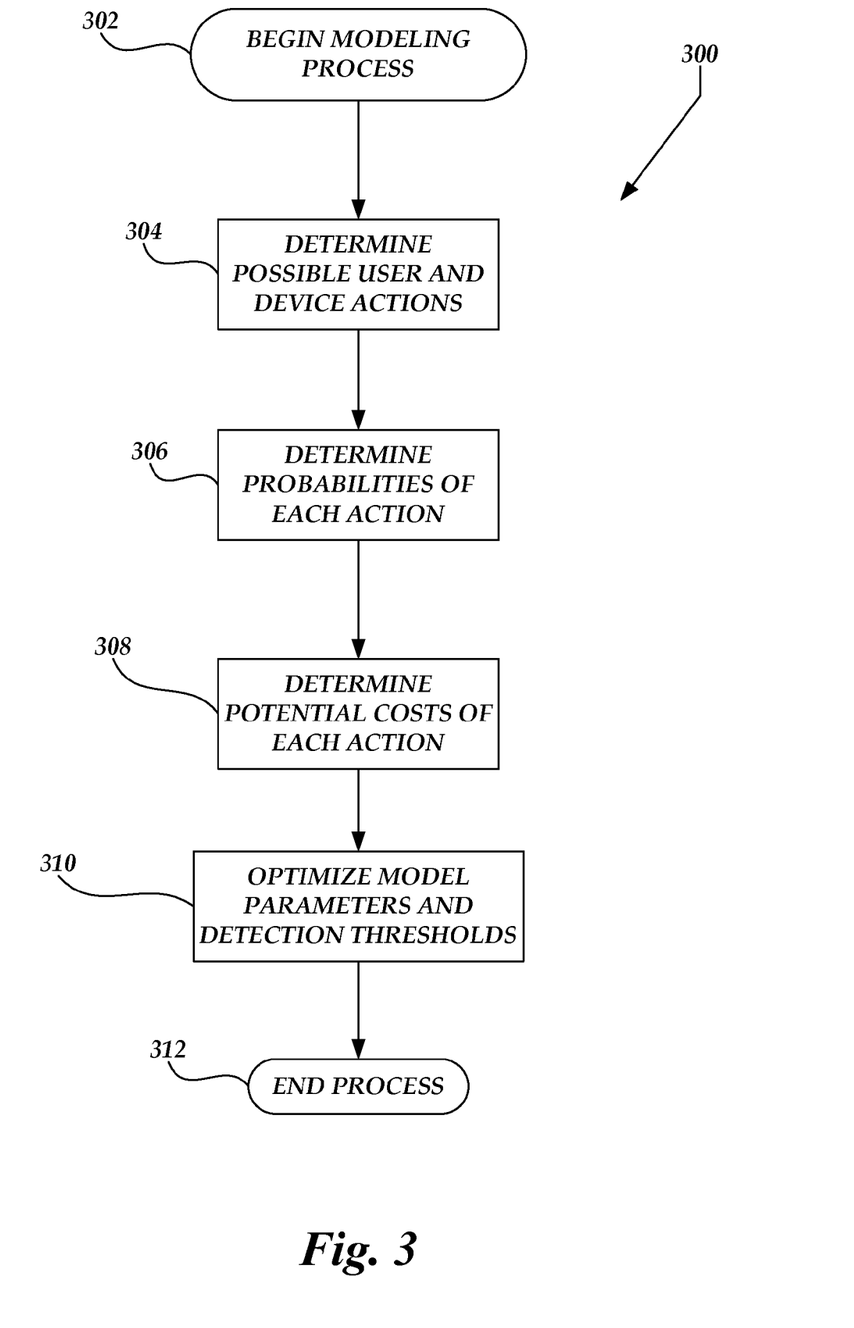
FIG. 3 is a flow diagram of an illustrative process for modeling errors in the detection system that may affect the user experience.

FIG. 3 depicts a process 300 for calculating an error model for a two-trial wake word module utilizing the potential scenarios depicted in FIG. 1. This modeling process may be used to determine or adjust detection thresholds to minimize false acceptance and false rejection errors based on the cost of such errors. The modeling process begins at block 302. The process 300 may be embodied in a set of executable program instructions stored on a computer-readable medium, such as one or more disk drives, of a computing device. When the process 300 is initiated, the executable program instructions may be loaded into the memory of a computing device and may be executed by one or more processors in communication with the computing device.

At block 304, the computing device executing the process 300 determines possible user and device actions. For example, in this process, possible user and device actions may be incorporated from FIG. 1. FIG. 1 depicts possible interactions between a user and a device for a two-trial wake word module. Possible interactions are depicted at states 100, 104, 106, 110, 112, 114, 120, 124, 126, and 130. Those interactions are intended to be illustrative rather than limiting examples.

At block 306, the computing device executing the process 300 determines the probabilities of one or more of the potential actions. For example, the probability that the user attempts again to wake up the device at state 120 after the first attempt fails may be represented by p(2Trial). There may be a two-trial time window during which the user is expected to try again. This time window between the first and second trial may be defined as $\delta_{2T}$. The detection model, h, described earlier may now be represented by $h_{1,1}$ for the user's first attempt and $h_{1,2}$ for the user's second attempt.

The wake word module may commit a false acceptance error if it either incorrectly hypothesizes the onset of a DDS instance at the initial pass of its analysis or within the two-trial time window $\delta_{2T}$. It may also commit a false acceptance error if, upon not detecting an actual DDS onset, it hypothesizes DDS onset outside the two-trial time window $\delta_{2T}$. The net probability that a false acceptance will occur ("PFA") may be given by:

$$p(\text{false accept}) = p(h_{1,1}(a(t)) \geq \theta_{1,1}, y'(t) = 0) + (1-p)(h_{1,1}(a(t)) \geq \theta_{1,1}, y'(t) = 0))p(h_{1,2}(a(t+\delta_{2T})) \geq \theta_{1,2}, y'(t) = 0) \quad [11]$$

The wake word module may commit a false rejection error if it does not accept a correct DDS onset instance in the first and/or the second attempt. The net probability of false rejection ("PFR") may be given by:

$$p(\text{false reject}) = p(h_{1,1}(a(t)) < \theta_{1,1}, y'(t) = 1)(1-p(2\text{Trial})) + (1-p(h_{1,1}(a(t)) < \theta_{1,1}, y'(t) = 1))p(2\text{Trial})p(h_{1,2}(a(t+\delta_{2T})) < \theta_{1,2}, y'(t) = 1) \quad [12]$$

In some embodiments, the first-trial elements of the two-trial wake word module may be the same as the one-trial wake word module disclosed earlier in the application. If $h_{1,1}$ is equal to $h_0$, the PFA of the two-trial wake word module may be greater than that of the one-trial wake word module. Additionally, the PFR of the two-trial wake word module may be less than the PFR of the one-trial wake word module. As such, the two-trial wake word module may be built around different probabilities than a one-trial wake word model, and may therefore be used to determine different detection threshold values.

At block 308, the potential costs of each action may be determined and incorporated into the two-trial wake word module as one net cost. The net cost for the two-trial wake word module, $c_1(t)$, may be calculated using the previously disclosed equation [7] and the probabilities in equation [11] and [12]. The net cost may be:

$$c_1(t) = \frac{c_{FAH}}{T}[P(h_{1,1}(a(t)) \geq \theta_{1,1}, y'(t) = 0) + \quad [13]$$
$$(1 - p(h_{1,1}(a(t)) \geq \theta_{1,1}, y'(t) = 0))$$
$$p(h_{1,2}(a(t+\delta_{2T})) \geq \theta_{1,2}, y'(t) = 0)](1 - p(\text{user initiates})) +$$
$$\frac{c_{FRR}}{|G|}[p(h_{1,1}(a(t)) < \theta_{1,1}, y'(t) = 1)(1 - p(2\text{Trial})) +$$
$$(1 - p(h_{1,1}(a(t)) < \theta_{1,1}, y'(t) = 1))p(2\text{Trial})$$
$$p(h_{1,2}(a(t+\delta_{2T})) < \theta_{1,2}, y'(t) = 1)]p(\text{user initiates}).$$

The above equation assumes that the cost of trying once, failing, and giving up may be the same as the cost of trying once, failing, trying again, failing, and giving up, e.g., that the cost at $h_{1,1}$ is the same as the cost at $h_{1,2}$. If these two costs are different for a user, the net cost can be further extended to account for the cost associated with FRR1 and FRR2. The formula can thus be extended to:

$$= \frac{c_{FAH}}{T}[p(h_{1,1}(a(t)) \geq \theta_{1,1}, y'(t) = 0) + \quad [14]$$
$$(1 - p(h_{1,1}(a(t)) \geq \theta_{1,1}, y'(t) = 0))$$
$$p(h_{1,2}(a(t+\delta_{2T})) \geq \theta_{1,2}, y'(t) = 0)](1 - p(\text{user initiates})) +$$
$$\left[\frac{c_{FRR1}}{|G|} p(h_{1,1}(a(t)) < \theta_{1,1}, y'(t) = 1)(1 - p(2\text{Trial})) + \right.$$
$$\frac{c_{FRR2}}{|G|}(1 - p(h_{1,1}(a(t)) < \theta_{1,1}, y'(t) = 1))p(2\text{Trial})$$
$$\left. p(h_{1,2}(a(t+\delta_{2T})) < \theta_{1,2}, y'(t) = 1)\right]p(\text{user initiates}).$$

The FRR1 and FRR2 costs may be the same or similar for a user if it is empirically determined that the user rarely makes a second attempt. If the wake word module determines that the user tends to make a second attempt after the first attempt has failed, the costs may be treated as different.

At block 310, the parameters of the wake word module may be optimized, as well as the detection thresholds. Both the parameters and the detection thresholds may be calculated to minimize costs that would be detrimental to the user experience. For example, $c_1(t)$ in equation 13 or 14 may be minimized in order to determine optimum or otherwise preferred model parameters and detection thresholds. The model may also seek to minimize the PFR and the PFA. The parameters and the detection threshold may alternatively be calculated to keep costs, FRR1, FRR2, and FAH below some error target. As discussed earlier in the application, FAH may be less than 1/10, FRR1 may be less than 1/10, and FRR2 may be less than 2/100.

The process 300 may terminate at block 312.

Accounting for Context

Figure 4:
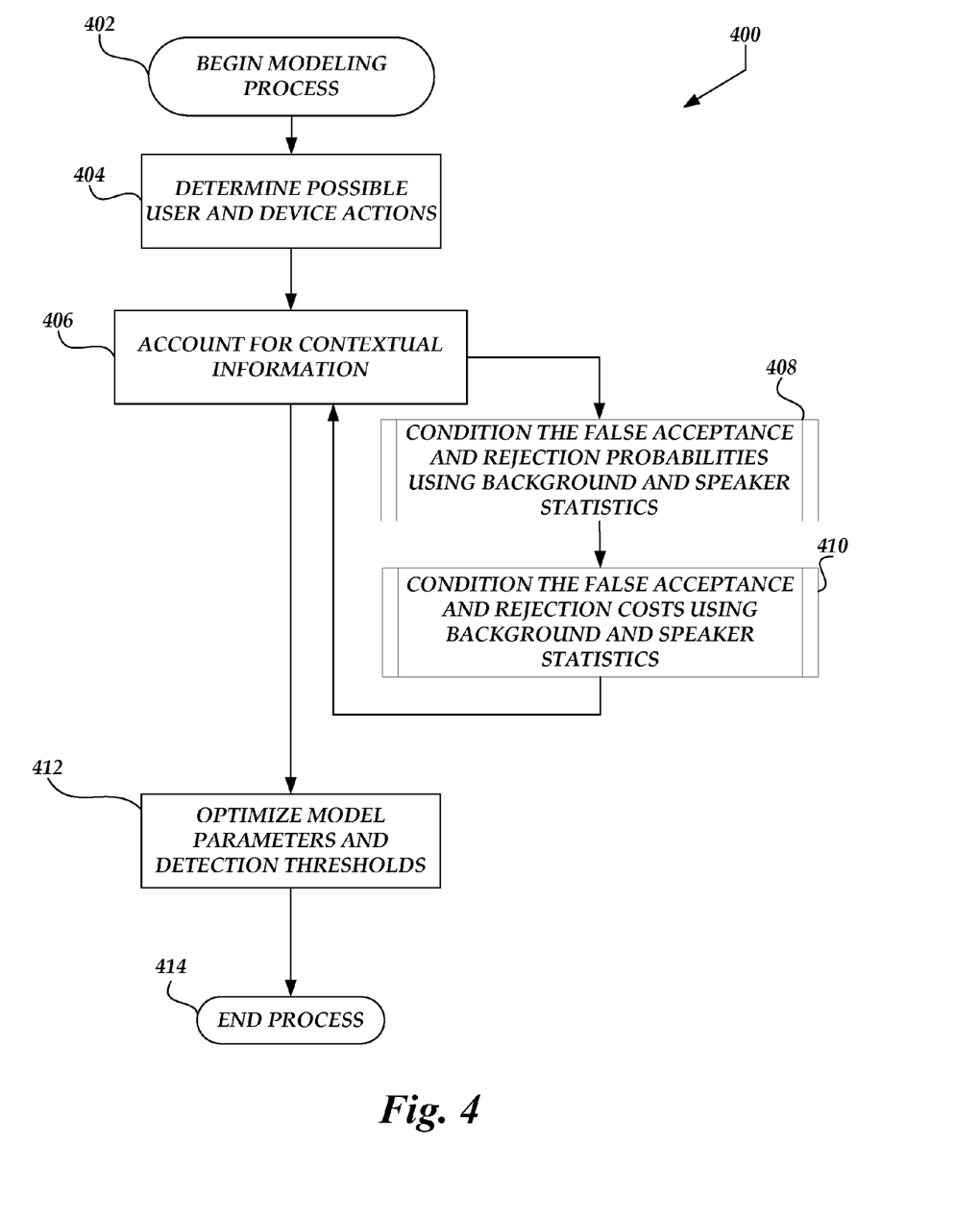
FIG. 4 is a flow diagram of an illustrative process for modeling errors in the detection system that further accounts for environmental conditions.

FIG. 4 depicts a flow diagram of an illustrative process 400 for modeling errors in the two-trial wake word module while accounting for contextual information (e.g., environmental conditions, user characteristics or tendencies, etc.). This process is similar to the process disclosed in FIG. 3 but further improves the two-trial wake word module by conditioning the false acceptance and rejection probabilities and the cost of false acceptance and false rejection on contextual information. This modeling process may be used to determine or adjust detection thresholds to minimize false acceptance and false rejection errors based on the cost of such errors.

The process 400 begins at block 402. The process 400 may be embodied in a set of executable program instructions stored on a computer-readable medium, such as one or more disk drives, of a computing device. When the process 400 is initiated, the executable program instructions may be loaded into the memory of a computing device and may be executed by one or more processors in communication with the computing device.

At block 404, the computing device executing the process 400 determines possible user and device actions. For example, in this process, possible user and device actions may be incorporated from FIG. 1, which depicts possible interactions between a user and a device for a two-trial wake word module. Possible interactions are depicted at state 100, 104, 106, 110, 112, 114, 120, 124, 126, and 130. These interactions are intended to be illustrative rather than limiting examples.

At block 406, relevant contextual information (e.g., background and environmental conditions, user tendencies, etc.) are determined. In some embodiments, the contextual information may be incorporated into the model by conditioning the false acceptance and rejection probabilities and the cost of false acceptance and false rejection on, e.g., information regarding the surrounding environment. For example, a user may tolerate higher false rejection rates when there is background noise compared to when environment is silent. In addition, there may be more false acceptances due to the presence of background noise. This combination of factors may support an increase in the detection threshold in order to reduce false acceptances. Although increasing the detection threshold can also increase false rejections, the user's higher tolerance for false rejections in the presence of background noise may offset concern over increased false rejections. This may be particularly important when the cost associated with false acceptances is substantially higher than the cost associated with false rejections.

If the same detection system and thresholds are used in both background noise ("BGN") and silent ("BGS") conditions, the user experience may not be optimal. The detection system may either have higher than optimal false rejection rates during BGS, or higher than optimal false acceptance rates during BGN. A detection system may implement multiple distinct models and thresholds that vary depending on the background noise so as to optimize for the user experience measured in terms of the cost.

The false acceptance and rejection probabilities may be conditioned at block 408. These probabilities may be conditioned such that FAR, FRR1, and FRR2 meet certain error targets, such as the error targets described earlier. In some embodiments, data collected from a large group of users may provide the two-trial wake word module with the background and speaker statistics. In other embodiments, the module may be adapted for an individual user or individual environment. For example, a given user may be categorized in a specific speaker cluster. Alternatively, an acoustic environment may be categorized in a specific acoustic cluster. This may help optimize the user experience.

At block 410, the cost of false acceptances and rejections may be conditioned using background and speaker statistics. The cost of false rejection for a first attempt $c_{FRR1}$ may be lower when there is background noise than when there is silence, e.g., $c_{FRR1}^{BGN} < c_{FRR1}^{BGS}$. The estimated probability of having background silence at time t may be represented by p(BGS(t)). The estimated probability of having the background noisy at time t may be represented by p(BGB(t))=1−p(BGS(t)). The formula for estimated cost may thus be:

$$c_{FRR1} = c_{FRR1}^{BGN}(1 - p(BGS(t))) + c_{FRR1}^{BGS}p(BGS(t)).  \quad [15]$$

At block 412, the model parameters and detection thresholds may be optimized to enhance user experience. As the wake word module becomes increasingly certain that the acoustic background contains noise, the cost associated with a false rejection, $c_{FRR1}$, may decrease. For example, a user listening to rock music may be less disturbed by a false rejection than a user in an environment with no background noise. In addition, a user listening to rock music may be more disturbed by a high false acceptance rate than a user in an environment with no background noise as the wake word module may interrupt the user's listening experience to process an erroneously hypothesized DDS. If the wake word module dynamically adjusts the thresholds for optimal cost, the resultant desired threshold may be higher than that used for the background silent scenario. The wake word module may allow for higher false rejection rates, given a user's tolerance under noisy conditions, to keep false acceptance rates within a reasonable range.

The process ends at block 414.

Illustrative Networking Environment

The process described above allows for a dynamical system with various operational thresholds, such as detection thresholds. However, the distribution of actual detection scores seen by deployed detection systems and devices may change over time, or may not be adequately represented by the training data used above or detection system generated above. For example, the actual usage of a wake word or cost of a particular action may be dependent upon the particular user or environment that uses the detection system. In addition, a given user may have different model preferences depending upon various factors, such as time of day, day of week, or other environmental or contextual factors. Adjustments to the dynamical detection system can be made in order to improve accuracy, reduce the false rejection rate, and otherwise improve detection performance.

Figure 5:
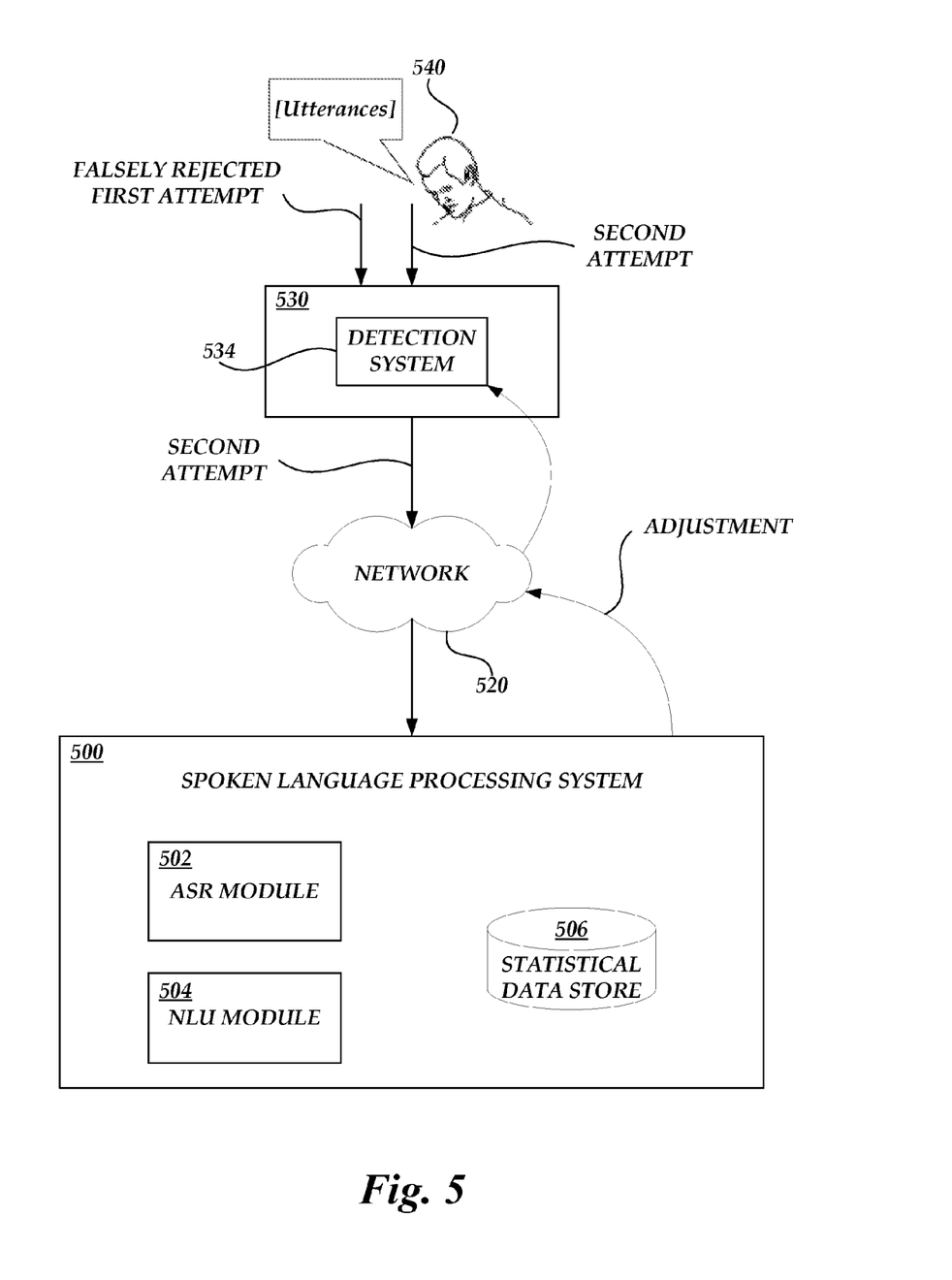
FIG. 5 is a block diagram of an illustrative networked environment containing a spoken language processing system and a detection system.

FIG. 5 illustrates an example environment in which the dynamical system may be implemented. As shown in FIG. 5, a client device 530 deployed by a user 540 (e.g., at home, work, or some other desired location) may communicate with a spoken language processing system 500 via a communication network 520. For example, the client device 530 may provide audio data associated with a confidence score exceeding the detection threshold (thereby indicating that it is likely DDS) to the spoken language system 500 for processing. The spoken language processing system 500 may be configured to perform speech recognition on the audio data and executed the command spoken by the user, respond to the query spoken by the user, or perform some other process.

The communication network 520 may be any wired network, wireless network, or combination thereof. In addition, the network 520 may be a personal area network, local area network, wide area network, cable network, satellite network, cellular telephone network, or combination thereof. For example, the communication network 520 may be a publicly accessible network of linked networks, possibly operated by various distinct parties, such as the Internet. In some embodiments, the communication network 520 may be a private or semi-private network, such as a corporate or university intranet. The communication network 520 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

The client device 530 can correspond to a wide variety of electronic devices. In some embodiments, the client device 530 may be a computing device that includes one or more processors and a memory which may contain software applications executed by the processors. The client device 530 may include a microphone or other audio input component for accepting speech input on which to perform speech recognition. The software of the client device 530 may include components for establishing communications over wireless communication networks or directly with other computing devices. In addition, the client device 530 may include a detection system 534 for detecting the presence of a detection target (e.g., speech, face, handwriting, etc.) in input. The detection system 534 may be a hardware component or a combination of hardware and software (e.g., a software module executed by one or more processors). Illustratively, the client device 534 may be a mobile device, such as a mobile phone, wearable computing device (e.g., a "smart watch" or "smart eyewear"), personal digital assistant ("PDA"), mobile gaming device, media player, electronic book reader, tablet computer, laptop computer, or the like. In some embodiments, the client device 530 may be a substantially stationary device, such as a television with program execution capabilities and network connectivity (a "smart TV"), set-top box, gaming console, home entertainment system, desktop computer, server computer, or the like.

The spoken language processing system 500 may correspond to a logical association of one or more computing devices configured to provide automatic speech recognition and other computing services to user devices 530 and other entities. The spoken language processing system 500 can include an ASR module 502, a natural language understanding ("NLU") module 504, and a statistical data store 506. In some embodiments, the spoken language processing system 500 may include additional or fewer modules or components than illustrated in FIG. 5.

In some embodiments, the features and services provided by the spoken language processing system 500 may be implemented as web services consumable via a communication network 520. In further embodiments, the spoken language processing system 500 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In operation, training data can be input to a detection system 534 that will be used in the deployed system (e.g., in client devices used in customer homes, workplaces, and the like). One example of a detection system that may be used is described in commonly-owned U.S. patent application Ser. No. 13/711,510 filed on Dec. 11, 2012 and incorporated herein by reference in its entirety. The detection system 534 can generate confidence scores from the training data. The training data can include sample audio data input representing any number of utterances spoken by various users (e.g., users with different vocal characteristics and speech patterns), containing various words and phrases (e.g., some may include the wake word and a sample spoken command, others may include speech that is not directed at the device), spoken in various environments (e.g., different room configurations, different background noise provides), and the like. In addition, the training data may include labels or other indicators regarding whether each audio sample is a true positive or a true negative. In some embodiments, targeted training data may be used, such as training data for particular environments, particular vocal characteristics, etc. The detection system 534 can process training data input to generate confidence scores representing the probability and/or likelihood that the input data includes the word to be detected.

These confidence scores may be used to generate a model of the distribution of confidence scores for the true positives and true negatives. Once such a model has been determined, the false rejection rate can be estimated. In some embodiments, the detection threshold can be selected and other system parameters can be determined to provide an optimal or improved user experience.

Illustratively, a user 540 may make a first attempt or an utterance that is captured by a microphone or other input component of the client device 530. The detection system 534 may calculate a score (e.g., a detection score or confidence score) for each portion of the input indicating the likelihood that the input includes the wake word or other detection target. If the confidence score meets or exceeds a detection threshold θ, the input can be provided to the spoken language processing system 500. The utterance may be DDS falsely rejected by the detection system 534 for failure to meet the detection threshold θ. The user 540 may make a second attempt to wake the client device 530 within a time window after the first attempt. Again, if the confidence score meets or exceeds a detection threshold θ, the input can be provided to the spoken language processing system 500. In one embodiment, the DDS system may falsely reject this second attempt for failure to meet detection threshold θ. In another embodiment, the detection system may compare the first attempt and the second attempt. For example, the detection system may store certain state information, such as a portion of previously processed audio data or some information derived therefrom. This information can be compared to information regarding the current audio. If the attempts are similar, the DDS system may "escalate" and provide the second attempt to the spoken language processing system though the confidence score is less than the original detection threshold θ.

In some embodiments, the detection system may be configured to detect different events for each of the attempts/trials. For example, the system may be configured to "wake up" in response to clapping instead of, or in addition to, using a wake word. Users can therefore clap for the first attempt and use a wake word for the second attempt, use a wake word for the first attempt and clap for the second attempt, clap for both attempts, or use the wake word for both attempts. In some cases, a combination of a clap and a wake word may be considered as a single (e.g., first or second) attempt.

At the spoken language processing system 500, the ASR module 502 can receive and process audio input, performing speech recognition on the input. The ASR results may be provided to the NLU module 504, which can determine a semantic meaning from the recognized speech. Subsequently the spoken language processing system 500 or some other system can perform some task based on the semantic meaning.

At certain times, the spoken language processing system 500 may provide the detection system 534 a new detection threshold to be used. The detection threshold may be altered or other parameter changed in response to data collected for analysis to improve performance of the detection system 534 and therefore to improve the user experience. In some embodiments, the detection system 534 may also, or alternatively, lower the operational threshold or alter model parameters on its own, without instruction from the spoken language processing system 500.

The detection threshold and parameters may be adjusted on a schedule, at random times, or in response to some event. For example, if the spoken language processing system 500 determines that the user 540 is making some utterance following some false rejection by the detection system 534, then the device 530 may be instructed to provide additional input data to determine whether it is DDS. As another example, the detection threshold may be lowered at random times to provide additional data with which to validate the current model. As yet another example, the model parameters may be adjusted based on some schedule to improve performance, such as when different users use the device at different times, and each user is associated with a different detection threshold to provide improved results in comparison with a general model for all users.

When utilizing the model, error rates may be measured in order to estimate the false rejection rate for a given device 530. Estimating the false rejection rate post-deployment may be done without uploading large volumes of audio segments below the operational threshold. Additionally, this estimating may be done while accounting for DDS instances that do not cross an operational threshold, including, for example, a detection threshold, and hence are never seen in the cloud stream. The estimating process of false rejections during deployment is fully described in commonly-owned U.S. patent application Ser. No. 14/135,309, filed on Dec. 19, 2013 and entitled ESTIMATING FALSE REJECTION RATE IN A DETECTION SYSTEM, which is hereby incorporated by reference in its entirety.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
   obtain (1) a model for detecting a keyword in an audio sample and (2) a first detection threshold corresponding to the model, wherein a detection score greater than the first detection threshold indicates that the keyword is present in the audio sample, and wherein the detection score is computed using the audio sample and the model;
   determine a first cost of computing a first incorrect detection hypothesis, wherein the first incorrect detection hypothesis corresponds to a detection score greater than the first detection threshold for an audio sample in which the keyword is not present, and wherein the first cost represents a cost of computing the first incorrect detection hypothesis at least a predetermined time period after computation of all prior incorrect detection hypotheses occurring before the first incorrect detection hypothesis;
   determine a second cost of computing a second incorrect detection hypothesis, wherein the second cost represents a cost of computing the second incorrect detection hypothesis within the predetermined time period following the first incorrect detection hypothesis, and wherein the second cost is different than the first cost;
   determine a second detection threshold based at least partly on the first and second costs, wherein the second detection threshold is determined such that the first and second costs are minimized;
   transmit the second detection threshold to a client device;
   receive audio data from the client device, wherein the client device transmits the audio data based at least partly on a detection score, determined using the audio data, satisfying the second detection threshold; and
   performing automatic speech recognition using at least a portion of the audio data to determine that data representing the keyword is present in the audio data, wherein the keyword comprises a word likely indicating device-directed speech.

2. The system of claim 1, wherein the first and second costs are based at least partly on information obtained from one or more users.

3. The system of claim 1, wherein at least one of the first or second costs is based at least partly on contextual information corresponding to background sound or user tendencies.

4. The system of claim 1, wherein the one or more processors are further programmed to determine a third cost of computing a third incorrect detection hypothesis, wherein the third incorrect detection hypothesis corresponds to computing a detection score less than the first detection threshold for an audio sample in which data representing the keyword is present.

5. The system of claim 1, wherein the executable instructions to determine the second detection threshold comprise executable instructions to minimize a cost function.

6. A computer-implemented method comprising:
   as implemented by one or more computing devices configured to execute specific instructions,
   obtaining (1) a model for detecting data representing a keyword in an audio sample and (2) a first detection threshold corresponding to the model, wherein a detection score greater than the first detection threshold indicates that data representing keyword is present in the audio sample, and wherein the detection score is computed using the model and the audio sample;
   determining a first cost of computing a first incorrect detection hypothesis, wherein the first incorrect detection hypothesis corresponds to a detection score satisfying the first detection threshold for input in which data representing the keyword is not present, and wherein the first cost represents a cost of computing the first incorrect detection hypothesis at least a predetermined time period following computation of a prior incorrect detection hypothesis;
   determining a second cost of computing, within the predetermined time period following the first incorrect detection hypothesis, a second incorrect detection hypothesis, wherein the second cost is different than the first cost;
   determining a second detection threshold based at least partly on the first and second costs;
   transmitting the second detection threshold to a client device;
   receiving audio data from the client device, wherein the client device transmits the audio data based at least partly on a detection score, determined using the audio data, satisfying the second detection threshold; and
   determining performing automatic speech recognition on at least a portion of the audio data to determine that data representing the keyword is present in the audio data, wherein the keyword comprises a word likely indicating device-directed speech.

7. The computer-implemented method of claim 6, wherein the first cost is equal to the second cost.

8. The computer-implemented method of claim 6, wherein the first cost is less than the second cost.

9. The computer-implemented method of claim 6, wherein determining the second detection threshold comprises computing the second detection threshold such that (1) a first cost determined using the second detection threshold is lower than the first cost determined using the first detection threshold, and (2) a second cost determined using the second threshold is lower than the second cost determined using the first detection threshold.

10. The computer-implemented method of claim 6, wherein the first and second costs are based at least partly on information obtained from one or more users.

11. The computer-implemented method of claim 6, wherein at least one of the first or second costs is based at least partly on contextual information.

12. The computer-implemented method of claim 11, wherein the contextual information corresponds to background sound or user tendencies.

13. The computer-implemented method of claim 6, further comprising determining a third cost of computing a third incorrect detection hypothesis, wherein the third incorrect detection hypothesis corresponds to computing a detection score less than the first detection threshold for input in which data representing the keyword is present.

14. The computer-implemented method of claim 6, wherein the determining the first cost comprises computing the first cost using (1) a first value, corresponding to a probability of computing an incorrect detection hypothesis, (2) a second value, corresponding to a probability of computing a correct detection hypothesis, (3) a third value, corresponding to a probability of occurrence of an event, and (4) a fourth value, corresponding to a measurement of a change in user satisfaction after an incorrect detection hypothesis.

15. One or more non-transitory computer readable media comprising executable code that, when executed, cause one or more computing devices to perform a process comprising:
obtaining (1) a model for detecting data representing a keyword in an audio sample and (2) a first detection threshold corresponding to the model, wherein a detection score greater than the first detection threshold indicates that data representing the keyword is present in the audio sample, and wherein the detection score is computed using the model and the audio sample;
determining a first cost of computing a first incorrect detection hypothesis, wherein the first incorrect detection hypothesis corresponds to a detection score satisfying the first detection threshold for input in which data representing the keyword is not present, and wherein the first cost represents a cost of computing the first incorrect detection hypothesis at least a predetermined time period following computation of a prior incorrect detection hypothesis;
determining a second cost of computing, within the predetermined time period following the first incorrect detection hypothesis, a second incorrect detection hypothesis, wherein the second cost is different than the first cost;
determining a second detection threshold based at least partly on the first and second costs;
transmitting the second detection threshold to a client device;
receiving audio data from the client device, wherein the client device transmits the audio data based at least partly on a detection score, determined using the audio data, satisfying the second detection threshold; and
performing automatic speech recognition on at least a portion of the audio data to determine that data representing the keyword is present in the audio data, wherein the keyword comprises a word likely indicating device-directed speech.

16. The one or more non-transitory computer readable media of claim 15, wherein determining the second detection threshold comprises computing the second detection threshold such that (1) a first cost determined using the second detection threshold is lower than the first cost determined using the first detection threshold, and (2) a second cost determined using the second threshold is lower than the second cost determined using the first detection threshold.

17. The one or more non-transitory computer readable media of claim 15, wherein the first and second costs are based at least partly on information obtained from one or more users.

18. The one or more non-transitory computer readable media of claim 15, wherein at least one of the first or second costs is based at least partly on contextual information.

19. The one or more non-transitory computer readable media of claim 18, wherein the contextual information corresponds to background sound or user tendencies.

20. The one or more non-transitory computer readable media of claim 15, the process further comprising determining a third cost of computing a third incorrect detection hypothesis, wherein the third incorrect detection hypothesis corresponds to computing a detection score less than the first detection threshold for input in which data representing the keyword is present.

21. The one or more non-transitory computer readable media of claim 15, wherein the determining the second cost comprises computing the second cost using (1) a first value, corresponding to a probability of computing an incorrect detection hypothesis, (2) a second value, corresponding to a probability of computing a correct detection hypothesis, (3) a third value, corresponding to a probability of occurrence of an event, and (4) a fourth value, corresponding to a measurement of a change in user satisfaction after an incorrect detection hypothesis.

* * * * *